(12) United States Patent
Yanagii

(10) Patent No.: US 7,051,708 B2
(45) Date of Patent: May 30, 2006

(54) ACCELERATOR OPENING DEGREE DETECTING APPARATUS IN THROTTLE CONTROL APPARATUS FOR TWO-WHEELED VEHICLE

(75) Inventor: Yoichi Yanagii, Kawasaki (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/119,617

(22) Filed: May 2, 2005

(65) Prior Publication Data
US 2005/0252486 A1 Nov. 17, 2005

(30) Foreign Application Priority Data
May 13, 2004 (JP) .............................. 2004-143099

(51) Int. Cl.
*F02D 31/00* (2006.01)
(52) U.S. Cl. ...................................... 123/376; 123/370
(58) Field of Classification Search ................ 123/399, 123/319, 396, 335, 370, 371, 376, 400, 403; 180/315, 335
See application file for complete search history.

(56) References Cited

U.S. PATENT DOCUMENTS

| | | | | |
|---|---|---|---|---|
| 4,580,537 A | * | 4/1986 | Uchiyama | 123/352 |
| 5,233,882 A | * | 8/1993 | Byram et al. | 74/514 |
| 6,276,230 B1 | * | 8/2001 | Crum et al. | 74/551.9 |
| 6,581,567 B1 | * | 6/2003 | Deguchi | 123/336 |
| 6,820,710 B1 | * | 11/2004 | Fechner | 180/170 |

* cited by examiner

*Primary Examiner*—Mahmoud Gimie
(74) *Attorney, Agent, or Firm*—R. Neil Sudol; Henry D. Coleman; William J. Sapone

(57) ABSTRACT

To provide an accelerator opening degree detecting apparatus for a two-wheeled vehicle, which is not damaged even if the two-wheeled vehicle takes a fall, and is excellent in waterproofness and weather resistance, a rotating shaft (11) is rotatably supported to a fixed member (10), an accelerator opening degree sensor (13) is arranged in one end (11b) of the rotating shaft (11), a rotating drum (12) is arranged in the other end (11a), the rotating drum (12) and an accelerator grip (16) are coupled by a coupling member (17), and the accelerator grip (16) and the rotating drum (12) are synchronously rotated.

2 Claims, 2 Drawing Sheets

ACCELERATOR OPENING DEGREE DETECTING APPARATUS IN THROTTLE CONTROL APPARATUS FOR TWO-WHEELED VEHICLE

TECHNICAL FIELD

The present invention relates to a throttle control apparatus controlling so as to open and close a throttle valve rotatably arranged within an intake passage passing through a throttle body by a motor, and more particularly to an accelerator opening degree detecting apparatus detecting a target opening degree of the throttle valve in correspondence to an opening degree of an accelerator held by a driver so as to output an electric signal.

BACKGROUND ART

In conventional, there has been known a throttle control apparatus which is provided with an accelerator opening degree sensor detecting an accelerator opening degree, so that electrically controls an opening degree of a throttle valve on the basis of an output signal of the accelerator opening degree sensor in correspondence to a pedaling amount of an accelerator pedal. (This structure is disclosed in Japanese Unexamined Patent Publication No. 10-287147).

Further, a structure disclosed in Japanese Unexamined Patent Publication No. 2001-180326 is generally used as the accelerator opening degree detecting apparatus in the throttle control apparatus mentioned above.

In accordance with this structure, when the driver steps on the accelerator pedal, an accelerator rotor is rotated on the basis of a support shaft together with a pedal arm, and a sensor rotor is rotated together with the accelerator rotor.

Further, on the basis of a change in an angle of rotation of the sensor rotor, a position of a contact portion which is in contact with a resistor applied to a substrate is displaced and an output voltage is increased or decreased, and an opening degree of the accelerator pedal can be detected by detecting the voltage.

The conventional accelerator opening degree detecting apparatus mentioned above is structured such that the driver steps on the accelerator pedal arranged in a leading end of the pedal arm rotatably supported by the support shaft by his or her foot so as to oscillate the pedal arm, and is used as an accelerator opening degree detecting apparatus for a motor vehicle.

On the other hand, in an operation of an accelerator in the two-wheeled vehicle, an accelerator grip is arranged in an end portion of a steering handle, the driver grips the accelerator grip, and the operation of the accelerator is executed by forward and backward rotating the accelerator grip.

In accordance with the structure mentioned above, the pedal arm type accelerator opening degree detecting apparatus for a motor vehicle can not be utilized for the accelerator grip type accelerator opening degree detecting apparatus for a two-wheeled vehicle.

In this case, it can be considered to arrange the accelerator opening degree sensor near the accelerator grip, for example, in a base portion close to the steering handle in the accelerator grip, as the accelerator opening degree detecting apparatus for the two-wheeled vehicle. However, in accordance with the layout of the accelerator opening degree sensor mentioned above, a problem peculiar to the two-wheeled vehicle is generated.

Since the steering handle portion including the accelerator grip of the two-wheeled vehicle is directly exposed to the external, and is arranged so as to protrude to an outermost side, the steering handle portion is damaged at a high probability which is almost necessarily, at a time when the two-wheeled vehicle takes a fall. Accordingly, the accelerator opening degree sensor arranged near the accelerator grip tends to be damaged.

Further, it can be considered to arrange a protection member around the accelerator opening degree sensor, however, the protection member is not preferable because of an increase of the number of parts and in view of an outer appearance of the vehicle body.

Further, since the accelerator grip is directly exposed to the external without being covered by any member, high waterproofness and high weather resistance are required in the accelerator opening degree sensor.

SUMMARY OF THE INVENTION

An accelerator opening degree detecting apparatus in accordance with the present invention is made by taking the problem mentioned above into consideration, and an object of the present invention is to provide an accelerator opening degree detecting apparatus in a throttle control apparatus for a two-wheeled vehicle, which is not damaged even if the two-wheeled vehicle takes a fall, and is appropriately used in the two-wheeled vehicle without requiring high waterproofness and high weather resistance.

In order to achieve the object mentioned above, in accordance with a first aspect of the present invention, there is provided an accelerator opening degree detecting apparatus in a throttle control apparatus for a two-wheeled vehicle, comprising:

a throttle body in which an intake passage passes through an inner portion thereof, and the intake passage is controlled so as to open and close by a throttle valve attached to a throttle valve shaft rotatably supported by the throttle body;

a motor coupled to the throttle valve shaft via a power transmission gear; and an accelerator opening degree sensor detecting and outputting a target opening degree of the throttle valve in correspondence to an angle of rotation of an accelerator grip, wherein an accelerator opening degree sensor is arranged in one end of a rotating shaft rotatably supported by the throttle body, a rotating drum is arranged in the other end, a rotating force in a return side direction of the accelerator grip is applied to the rotating shaft by a return spring, the rotating drum and the accelerator grip are coupled by a coupling member, and the accelerator grip and the rotating drum are synchronously rotated.

Further, in accordance with a second aspect of the present invention, in addition to the first aspect mentioned above, an adjusting screw for adjusting a return position of the rotating drum at a time when the accelerator grip is returned to the maximum is arranged so as to be brought into contact with the rotating drum.

In accordance with the first aspect of the present invention, when the driver rotationally operates the accelerator grip, the rotation is transmitted to the rotating drum via the coupling member so as to rotate the rotating shaft in synchronous with the angle of rotation of the accelerator grip.

Further, the accelerator opening degree sensor detects the rotation of the rotating shaft, and outputs an electric signal in correspondence to the rotation, that is, an electric signal in correspondence to the rotation of the accelerator grip.

On the other hand, the motor rotates as a result of an electric signal from an ECU to which an electric signal corresponding to the rotation of the accelerator grip is input, the rotation of the motor is transmitted to the throttle valve shaft via a power transmission gear, and the throttle valve opens and closes the intake passage in correspondence to the rotation of the accelerator grip.

In accordance with the accelerator opening degree detecting apparatus mentioned above, since the throttle body is arranged at the other position apart from the accelerator grip, the rotating shaft, the rotating drum and the accelerator opening degree sensor are arranged on the throttle body, and the rotating drum and the accelerator grip are coupled by the coupling member.

Since the throttle body is generally arranged in a space below a seat or a fuel tank of a two-wheeled vehicle, it is possible to optionally arrange the accelerator opening degree detecting apparatus, for example, in a suitable place below a seat, a fuel tank or the like of the two-wheeled vehicle. Accordingly, even if the two-wheeled vehicle takes a fall, it is possible to minimize damage to the accelerator opening degree detecting apparatus.

Further, since it is possible to lessen exposure of the accelerator opening degree detecting apparatus directly to rain and a sunbeam, it is possible to lower a manufacturing cost without requiring high waterproofness and high weather resistance.

Further, the accelerator grip mechanically operates to open and close the throttle valve by using a conventional valve opening wire and a valve closing wire. Since it is possible to use the accelerator grip of the so-called mechanical throttle control apparatus as it is, no novel part is required, and it is not necessary to change a design of the accelerator grip.

Further, in accordance with the second aspect of the present invention, it is possible to freely adjust the minimum returning angle of the rotating shaft including the rotating drum by screwing the adjusting screw. In accordance with this structure, it is possible to accurately adjust the output voltage of the accelerator opening degree sensor at a time of the minimum returning angle of the rotating shaft to a fixed reference voltage.

DESCRIPTION OF THE PREFERRED EMBODIMENT

Figure 1:
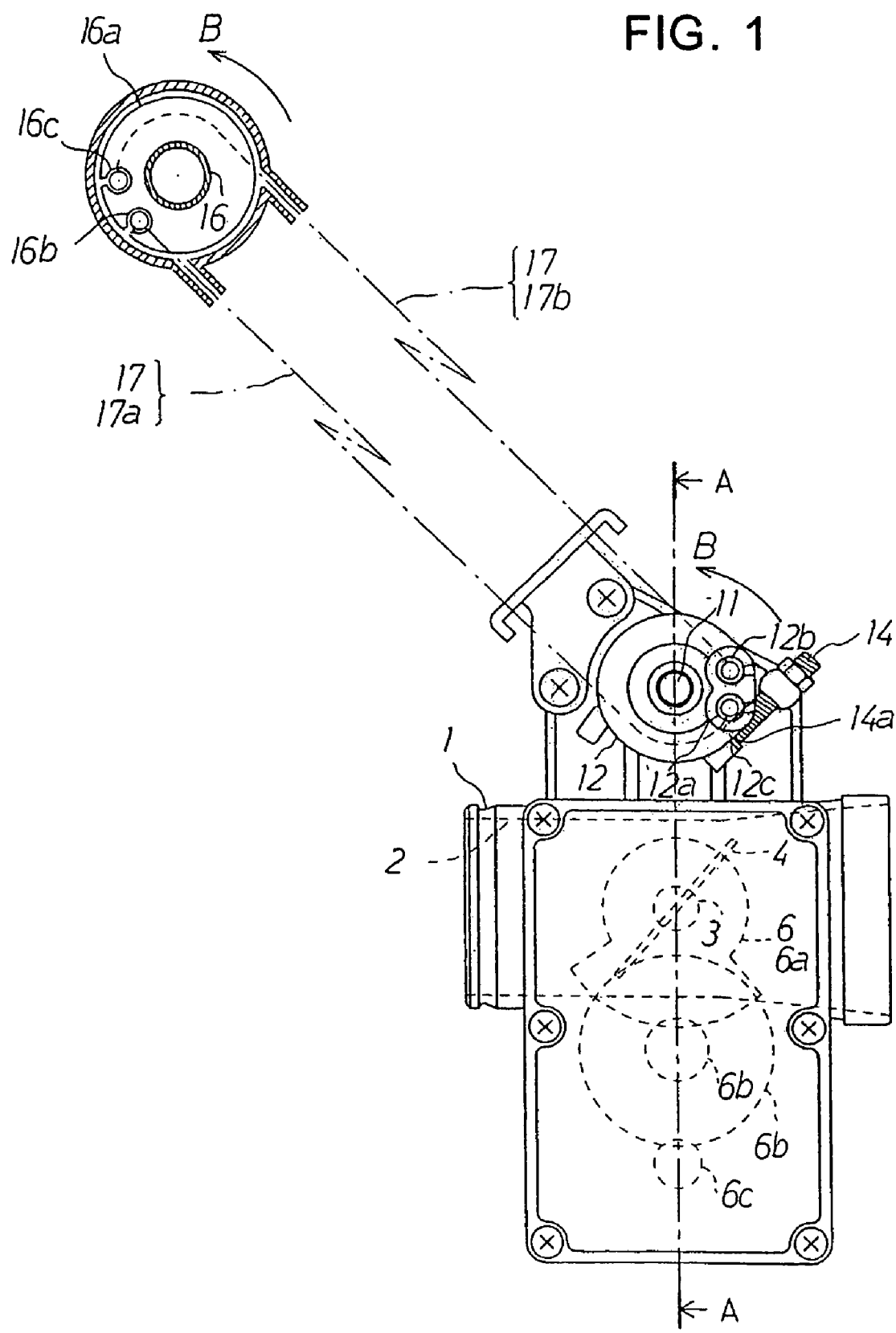
FIG. 1 is a side view showing an embodiment of an accelerator opening degree detecting apparatus in a throttle control apparatus for a two-wheeled vehicle in accordance with the present invention.

A description will be given below of an embodiment in accordance with the present invention with reference to the accompanying drawings.

Reference numeral 1 denotes a throttle body in which an intake passage 2 is provided so as to pass through sideward in an inner portion. A throttle valve shaft 3 rotatably supported to the throttle body 1 is arranged across the intake passage 2, and a butterfly type throttle valve 4 opening and closing the intake passage 2 is attached to the throttle valve shaft 3.

Figure 2:
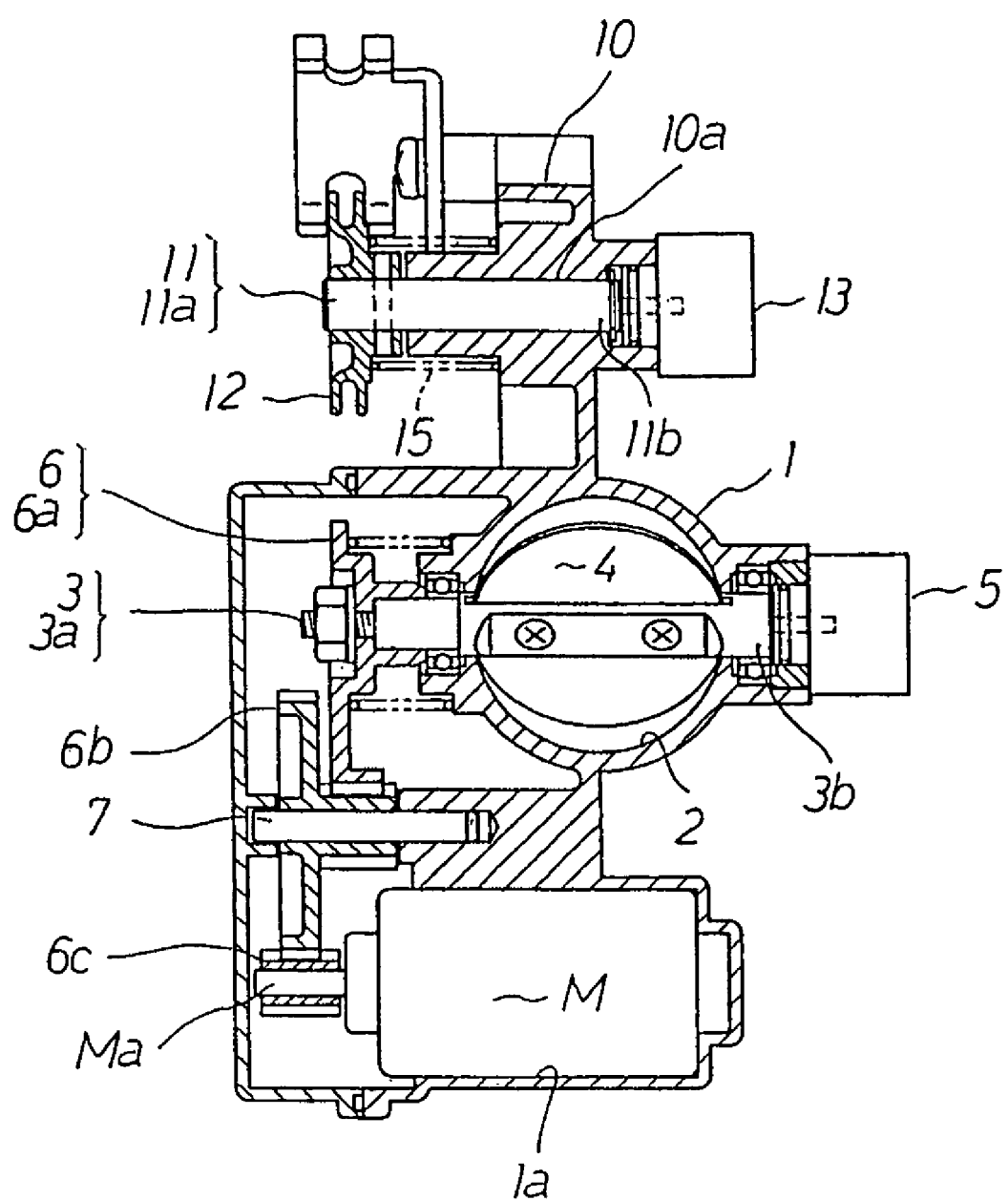
FIG. 2 is a vertical cross sectional view of a main body in a line A—A in FIG. 1.

The throttle valve shaft 3 arranged across the throttle body 1 is arranged in such a manner that a left end 3*a* in FIG. 2 protrudes toward an outer side, and a throttle valve angle sensor 5 detecting an opening degree of the throttle valve shaft 3 and outputting an electric signal toward an external portion is attached to a right end 3*b*.

Further, a motor receiving recess portion 1*a* is provided in a lower side of the intake passage 2 of the throttle body 1, and a motor M is arranged so as to be received within the motor receiving recess portion 1*a*.

Further, a final gear 6*a* is fixedly arranged in the left end 3*a* of the throttle valve shaft, and the final gear 6*a* is engaged and coupled with a pinion gear 6*c* fixedly arranged in an output shaft Ma of the motor M via an intermediate gear 6*b* rotatably supported to a shaft 7.

A power transmitting gear 6 is formed by the final gear, the intermediate gear 6*b* and the pinion gear 6*c*.

A throttle control apparatus is structured in the manner mentioned above.

Reference numeral 10 denotes a fixed member fixedly arranged in an engine, or a frame of a two-wheeled vehicle (both of which are not illustrated). The fixed member 10 is integrally formed in the throttle body 1 fixedly arranged in the engine in the present embodiment.

A shaft hole 10*a* is provided in the throttle body 1 as the fixed member so as to pass therethrough sideward, and a rotating shaft 11 is arranged in the shaft hole 10*a* so as to be rotatably supported.

Further, a rotating drum 12 in which a first locking hole 12*a* and a second locking hole 12*b* are provided is fixedly arranged in the other end 11*a* of the rotating shaft, and an accelerator opening degree sensor 13 is fixedly arranged in one end 11*b* of the rotating shaft 11.

The accelerator opening degree sensor 13 is known, a rotor fitted to the one end 11*b* of the rotating shaft 11 and rotating synchronously with the rotating shaft 11 is arranged within a case, and a slider arranged in an upper surface of the rotor is rotationally moved on a resistance body in contact therewith.

Further, an arm portion 12*c* extending sideward is formed in the rotating drum 12, a leading end 14*a* of an adjusting screw 14 screwed with the throttle body 1 as the fixing member 10 is brought into contact with the arm portion 12*c*, and an angle of rotation of the rotating drum 12 can be adjusted by screwing the adjusting screw 14.

Further, reference numeral 15 denotes a coil-shaped return spring in which one end is locked to the throttle body 1, and the other end is locked to the rotating drum 12. The return spring 15 applies a rotating force in a side of a returning direction B of an accelerator grip mentioned below (a counterclockwise direction in FIG. 1) to the rotating drum 12.

In accordance with the structure mentioned above, the arm portion 12*c* of the rotating drum 12 is energized by the spring force of the return spring 15 so as to be brought into contact with the leading end 14*a* of the adjusting screw 14.

Reference numeral 16 denotes an accelerator grip which is attached to an end portion of a steering handle (not shown) of the two-wheeled vehicle and is rotated by a driver. A first locking hole 16*b* and a second locking hole 16*c* are provided in a drum portion 16*a* integrally formed in the accelerator grip 16.

Further, the first locking hole 16*b* of the drum portion 16*a* and the first locking hole 12*a* of the rotating drum 12 are coupled by an open side wire 17*a* of a coupling member 17, and the second locking hole 16*c* of the drum portion 16*a* and the second locking hole 12*b* of the rotating drum 12 are coupled by a return side wire 17*b* of the coupling member 17.

In accordance with the structure mentioned above, the accelerator grip 16 and the rotating drum 12 are coupled by the coupling member 17 constituted by the open side wire 17a and the return side wire 17b so as to synchronously rotate.

A description will be given next of an operation thereof.

In a state in which the accelerator grip 16 is returned to a returning direction B to the maximum (the maximum return state means a state in which the driver does not operate the accelerator grip 16 or a state in which the driver rotates the accelerator grip 16 in a counterclockwise direction to the maximum in FIG. 1), the rotating drum 12 is rotated in the returning direction B side (the counterclockwise direction) by the return side wire 17b, and is set to a state in which the arm portion 12c of the rotating drum 12 is brought into contact with the leading end 14a of the adjusting screw 14.

This state corresponds to an idling opening degree of the throttle valve 4 maintaining a minimum idling operation of the engine, the accelerator opening degree sensor 13 detects an opening degree of the rotating shaft 11 rotating in synchronous with the rotating drum 12, and outputs an electric signal corresponding to the opening degree to an ECU (not shown), and the ECU outputs an electric signal corresponding to the electric signal toward the motor M.

In accordance with the structure mentioned above, the motor M is rotated on the basis of the electric signal from the ECU, the rotation is transmitted to the throttle valve shaft 3 via the power transmitting gear 6 constituted by the pinion gear 6c, the intermediate gear 6b and the final gear 6a, and the throttle valve 4 opens the intake passage 2 so as to maintain it at the idling opening degree on the basis of the rotation of the throttle valve shaft 3, whereby the idling operation of the engine is executed.

In the maximum return state of the accelerator grip 16, the arm portion 12c of the rotating drum 12 is arranged so as to be brought into contact with the leading end 14a of the adjusting screw 14, and it is possible to precisely adjust the angle of rotation of the rotating shaft 11 including the rotating drum 12 by screwing the adjusting screw 14 at this time.

In accordance with the structure mentioned above, it is possible to accurately adjust the electric signal (voltage) of the accelerator opening degree sensor 13 in the maximum return state of the accelerator grip 16 to a predetermined fixed voltage, whereby it is possible to accurately maintain the idling opening degree of the throttle valve 4 by the motor M.

Further, the accelerator opening degree sensor 13 is structured such that the voltage is changed in an approximately proportional manner in correspondence to a displacement of the angle of rotation on the basis of the fixed angle of rotation of the rotating shaft 11, and can output an accurate voltage signal to the displacement of the angle of rotation of the rotating shaft 11.

Further, when the engine is operated, the driver optionally rotates the accelerator grip 16, and the rotation of the accelerator grip 16 is transmitted to the rotating drum 12 via the open side wire 17a and the return side wire 17b of the coupling member 17 so as to rotate the rotating shaft 11 including the rotating drum 12 synchronously with the accelerator grip 16.

Accordingly, the accelerator opening degree sensor 13 detects the angle of rotation of the rotating shaft, and outputs the electric signal corresponding thereto toward the ECU (not shown), and the ECU outputs the electric signal based on the electric signal toward the motor M, whereby the motor M is rotated in correspondence to the rotating operation of the accelerator grip 16. Further, the rotation of the motor M is transmitted to the throttle valve shaft 3 via the power transmitting gear 6 so as to rotate the throttle valve shaft 3, whereby the throttle valve 4 controls so as to open and close the intake passage 2 in correspondence to the rotating operation of the accelerator grip 16.

In accordance with the accelerator opening degree detecting apparatus in the throttle control apparatus mentioned above, since the accelerator opening degree sensor 13 including the rotating shaft 11 and the rotating drum 12 is arranged in the throttle body 1 which is independently arranged from the accelerator grip 16, it is possible to arrange the accelerator opening degree detecting apparatus in the space below the seat or the fuel tank of the two-wheeled vehicle, together with the throttle body fixed to an engine. Accordingly, even if the two-wheeled vehicle takes a fall, it is possible to inhibit a damage of the accelerator opening degree detecting apparatus mentioned above.

Further, since it is possible to lessen exposure of the accelerator opening degree detecting apparatus directly to water or a sunbeam, high waterproofness and high weather resistance are not required.

Further, since the conventional accelerator grip 16 can be used as it is, no novel part is required, and it is not necessary to change an outer appearance of the accelerator grip 16.

In accordance with the structure mentioned above, it is possible to provide the accelerator opening degree detecting apparatus in the throttle control apparatus which is effectively used in the two-wheeled vehicle.

What is claimed is:

1. An accelerator opening degree detecting apparatus in a throttle control apparatus for a two-wheeled vehicle, comprising:

a throttle body in which an intake passage passes through an inner portion thereof, and said intake passage is controlled so as to open and close by a throttle valve attached to a throttle valve shaft rotatably supported by the throttle body;

a motor coupled to the throttle valve shaft via a power transmission gear; and an accelerator opening degree sensor detecting and outputting a target opening degree of the throttle valve in correspondence to an angle of rotation of an accelerator grip, wherein the acceleraior opening degree sensor is arranged at one end of a rotating shaft rotatably supported by the throttle body, a rotating drum is arranged at the other end, a rotating force in a return side direction of the accelerator grip is applied to said rotating shaft by a return spring, said rotating drum and the accelerator grip are coupled by a coupling member, and the accelerator grip and the rotating drum are synchronously rotated.

2. An accelerator opening degree detecting apparatus in a throttle control apparatus for a two-wheeled vehicle as claimed in claim 1, wherein an adjusting screw for adjusting a return position of the rotating drum at a time when the accelerator grip is returned to the maximum is arranged so as to be brought into contact with said rotating drum.

* * * * *